UNITED STATES PATENT OFFICE.

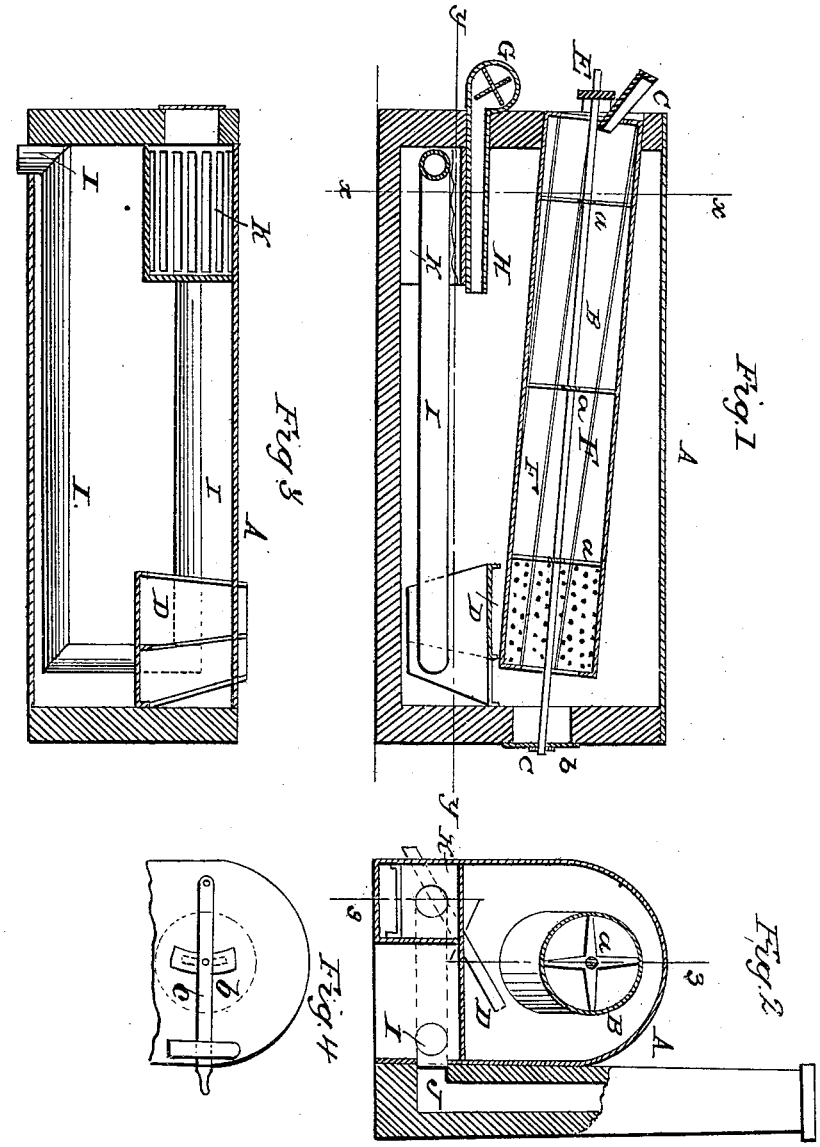

J. H. PATTEE AND E. S. CLEVELAND, OF GALVA, ILLINOIS.

GRAIN-DRIER.

Specification forming part of Letters Patent No. 51,348, dated December 5, 1865.

*To all whom it may concern:*

Be it known that we, J. H. PATTEE and E. S. CLEVELAND, of Galva, in the county of Henry and State of Illinois, have invented a new and useful Improvement in Grain-Driers; and we do hereby declare that the following is a full, clear, and exact description thereof, which will enable others skilled in the art to make and use the same, reference being had to the accompanying drawings, forming part of this specification, in which—

Figure 1 is an elevation of a longitudinal section taken on the line $z$, Fig. 2, of a grain-drier made after our invention. Fig. 2 is a cross-section taken on the line $x$ of Fig. 1. Fig. 3 is a plan view of a horizontal section taken on the line $y$ of Fig. 1. Fig. 4 is a view of the rear of the kiln.

Similar letters of reference indicate like parts.

This improvement belongs to that class of grain-driers which use a revolving cylinder, through which the grain passes. The cylinder in this invention is open at each end, and is inclosed within a heating-chamber, and it is inclined so as to cause the grain to be moved through it by gravity. The dust and dirt and other foreign matter of less size than the grain are discharged through perforations made in the sides of the cylinder near its inner end, while the grain is discharged from the open end of the cylinder. More than one cylinder may be used in the same heating-chamber, although only one cylinder is exhibited in this example.

A designates a heating chamber or kiln, which has a furnace, K, and a chimney, J.

B is a grain-drying cylinder, whose shaft E is suitably supported in the end walls of the kiln, being adjustably supported at that end which is the lowest by means of a lever, $c$, which carries the lower end of the shaft, so that the cylinder can be raised or lowered according to the stage of the work and according to the retardation or acceleration desired to be given to the passage of the grain through it. The shaft E at that end of the kiln moves in a vertical slot, which is covered in all positions of the lever $c$ by a plate, $b$, through which the shaft passes, and which plate therefore moves with the shaft, being long enough to cover the slot in all the changes of the lever.

The cylinder may be fed with grain by means of a hopper, $c$, or by a suitable pipe.

The shaft is supported within the cylinder by spiders $a$, which also serve to sustain strips or ribs F, four or more in number, extending throughout the cylinder for its whole length, and placed next to its inner circumference. Their office is to lift the grain and as they ascend deliver it in showers over their edges toward the center of the cylinder, thereby maintaining a constant agitation and overturning of the mass of grain.

The lower part of the cylinder is perforated throughout its entire circumference with fine holes, intended to pass the dirt and other foreign matter of less bulk than a kernel of grain.

D is a receiving hopper or trough, which is placed beneath the discharging end of the cylinder, being wide enough also to extend beneath its perforated parts. That portion of the trough which reaches past the end of the cylinder is extended to the end wall of the kiln, and it is divided from that portion which is beneath the perforations, so as to keep the grain separate from the dirt and other matters delivered from the cylinder. Each division is continued to the end of the trough, so that the grain and dirt may be discharged into different receptacles.

K is a furnace placed in one corner of the kiln. A pipe, I, proceeding from it, is carried to and fro through the kiln, so as to distribute heat by radiation throughout the kiln. The pipe may be made to traverse the kiln several times before it is led to the chimney J.

H is an air-chamber located over the furnace. A fan-blower, G, is placed at its mouth to force a constant supply of air into the body of the kiln, and since the air must pass through the hot-air chamber H, it will become heated before it reaches the inner end of said chamber. The hot air from the chamber H may, if desired, be conducted by a pipe into the discharging end of the cylinder, or it may be merely discharged into the open kiln, relying upon the natural pressure of the atmosphere to cause currents of sufficient energy to pass up through the cylinder. The air, after passing through the cylinder, will be discharged at its front end, outside of the kiln, laden with dust and moisture from the grain.

Rotary motion is to be given to the cylinder

B, and the same power which drives it can be made to drive the fan.

We claim as new and desire to secure by Letters Patent—

The combination of the inclined and ribbed cylinder B F, adjusting-lever c, sliding plate b, fan G, hot-air chamber H, furnace K, and flue I, all arranged to operate as and for the purposes specified.

J. H. PATTEE.
E. S. CLEVELAND.

Witnesses:
N. PIERCE,
N. KELSEY.